United States Patent Office 3,025,089
Patented Mar. 13, 1962

3,025,089
CLAMPS FOR TUBULAR STRUCTURES
Clement Ramsden, 10 Princes Court, Princes Ave.,
Benoni, Transvaal Province, Union of South Africa
Filed June 9, 1959, Ser. No. 819,115
Claims priority, application Union of South Africa
June 12, 1958
10 Claims. (Cl. 287—54)

This invention relates to clamps for holding together tubes and other round members, hereinafter referred to as tubes, and is of particular service in tubular structures such as are used for scaffolding in building operations.

In tubular structures it is necessary to fasten together lengths of tubes generally at right angles to one another but often at other angles and sometimes parallel to one another. To effect such fastening two clamps are usually combined, each clamp consisting of a pair of circular grips, and each pair of grips being separately clamped round the tube by a bolt and with the two clamps held together by a third bolt.

It is the object of this invention to provide an improved type of clamp which will be more economic to produce and more simple to use than the abovementioned type.

In accordance with this invention a clamp for holding together circular members such as tubes comprises a pair of oppositely positioned clamping members with a part cylindrical recess in each, a boss on each member perforated normally to the axis of the recess, a bolt fitting through a washer positioned on the bolt between the clamping members, said washer having opposite faces inwardly curved to the same radius as that of the recess in the adjacent clamping member and nuts on each end of the bolt to force the clamping members towards the washer.

According to further features of the invention, one or both faces of the washer may be of annular curved shape or have one or two surfaces shaped as a minor segment of a cylinder. Alternatively, one or both faces of the washer may be of annular curved shape penetrated by cylindrical surfaces.

The invention also provides for the cylindrical curves on opposite sides of the washer to be at any suitable angle to one another, for the washer to be integral with or secured in the length of the bolt.

The invention is illustrated in the accompanying drawings in which.

Figure 1:
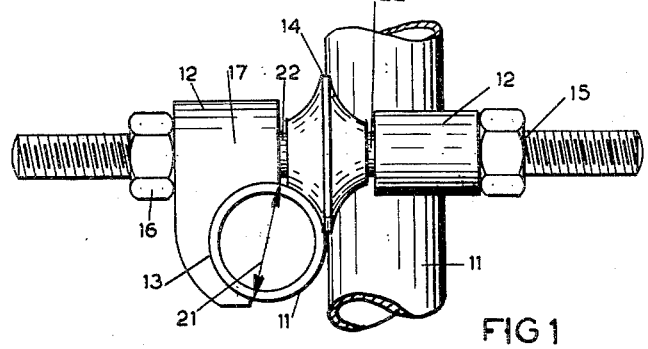
FIG. 1 shows a type of clamp for holding together tubes of equal diameters with their axes at any angle in parallel planes.

The normally used type of clamp according to this invention is shown in FIG. 1. It is suitable for fastening together a pair of tubes 11 of similar size to form uprights and putlogs, ledgers or other cross or transverse members in a scaffolding structure. Usually the tubes 11 will be fastened, as shown, at right angles to one another but in accordance with this invention they may be swivelled in parallel planes to any angle with one another.

Figure 2:
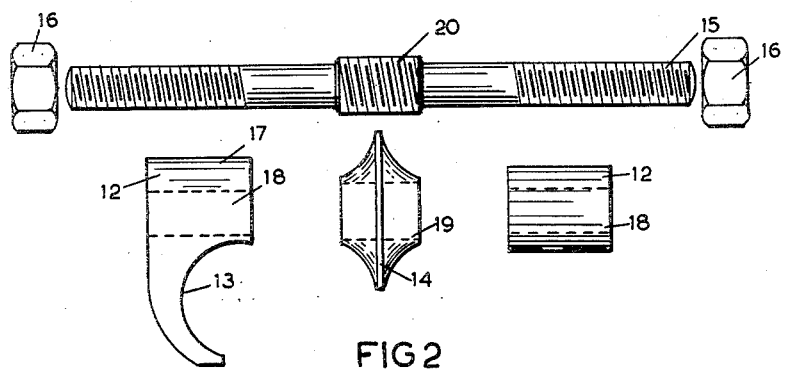
FIG. 2 is an exploded view of the parts making up the clamp.

The clamp in its simplest form comprises four members as illustrated in FIG. 2, and consisting of two clamping members 12 each with a substantially semi-cylindrical recess 13, a washer 14 between them, and a bolt 15 and nuts 16, to clamp together a pair of tubes 11 fitting in the recesses 13 of the members 12.

The members 12 are of sufficient width to afford a good grip on the tubes 11 to be fastened together. Usually the said width is somewhat greater than the radius of the tubes 11. The wall of each member 12 is thickened to form a boss 17 at one lip of the recess 13 and said bosses each have a hole 18 for the bolt 15 to pass therethrough normal to the axis of the corresponding recess 13.

The members 12 are threaded onto the bolt 15 so that the recesses 13 face inwardly and on the same bolt 15 between the bosses 17, is the circular washer 14.

It is found convenient when assembling the clamp for use, to first place the washer 14 in position. The washer 14 may be welded to the bolt 15 or its bore 19 may be screw-threaded to fit the part 20 on the bolt 15. Conveniently the part 20 may be greater in diameter than the remainder of the bolt 15.

The washer 14 has a diameter such that when it is on the bolt 15 it extends approximately to the centre of the recesses 13 in the clamping members 12 on the bolt 15, and accordingly in line with the axes of the tubes 11 to be clamped together. The washer 14 is thickest about its centre whence its opposite sides curve regularly towards one another so that it is thinnest at its greatest diameter. These curves in section form circular arcs corresponding in diameter to that of the outside surface of tubes 11.

It will be noted that the diameter 21 of the recess 13 is in FIGS. 1 and 2, not normal to the bolt 15. The reason for this is that it enables the spaces 22 on the bolt 15 between the washer 14 and the bosses 17 to be made as narrow as conveniently possible to avoid bending of the bolt 15 at these points when the clamp is in use.

It will thus be understood that in the clamp each tube 11 has approximately one half of its circumference in surface contact with the recess 13 in the member 12 and a further portion of its circumference in line contact on one face of the washer 14.

Figure 3:
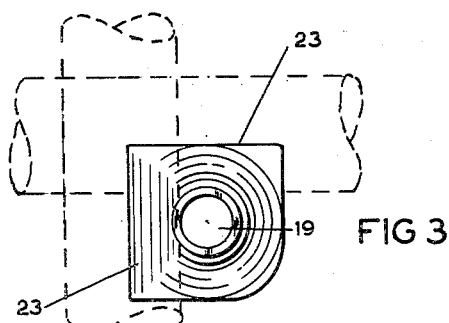
FIGS. 3 and 4 show washers of modified shape.

The clamps may be required for tubes 11 which must lie in relation to one another at a particular angle. For example if putlogs are to be secured to uprights, the tubes 11 would be fastened at right angles to one another. In such an application the washers 14 would preferably have, instead of the curves above described, portions having part cylindrical curves 23 at right angles to one another, as indicated in FIG. 3, thus enabling the washers to make a surface contact with the tubes 11 as opposed to a line contact. Preferably apart from these two portions which have the part cylindrical curves 23, the remaining surfaces of the washers 14 are of the normal annular curved shape described above so that the washer can be used as already described for fastening tubes 11 together at any angle to one another in parallel planes.

Figure 4:
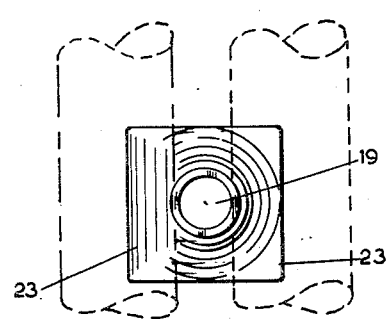

When a number of tubes 11 are to be fastened together at definite angles other than 90° the part cylindrical curves 23 on opposite sides of the washer 14 may be formed at the required angle. For example the axes of the curves 23 may be parallel as indicated in FIG. 4.

Figure 5:
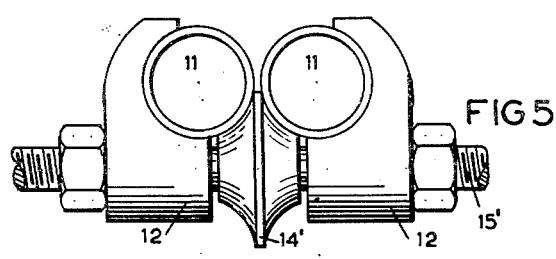
FIG. 5 illustrates a modified form of clamp and tube assembly.

It is possible for two tubes to be attached parallel to one another on the same side of the bolt, as shown in FIG. 5. In this case the washer 14' which is welded to the bolt 15' may be of the annular curved shape illustrated in FIG. 1 or alternatively the faces directed towards the clamps have two part cylindrical portions corresponding to the cylindrical surfaces of the tubes.

All the surfaces in the clamps in contact with the tubes may be serrated or have rubber bonded to said surfaces, or be otherwise shaped or surface treated to increase their grip.

In use the clamp according to this invention is easily handled. For example if two tubes 11 are to be fastened together at any angle in parallel planes one nut 16 on the bolt 15 and the corresponding clamping member 12 opposite the fixed washer 14 are removed. The tube 11 is then held against the washer 14, the clamping member 12 is threaded on the bolt 15 and the nut tightened to hold the parts together. The nut on the opposite end of bolt 15 is then slackened to allow the second tube 11 to be put in position at the required angle and the nut then tightened against the second clamping member 12 to complete the clamping together of the tubes 11.

What I claim as new and desire to secure by Letters Patent is:

1. A clamp comprising in combination: bolt means having a longitudinal axis; first and second clamping means rotatably mounted on said bolt means in axially spaced relationship, each of said clamping means having a clamping surface complementary to a fraction of the surface of an object to be clamped, a washer mounted in axially fixed position on said bolt means intermediate said first and second clamping means and having two opposite faces, each complementary to a fraction of the surface of an object to be clamped, at least one of said washer faces being annular about said axis and of concavely arcuate cross section in all axial planes, the clamping surface of the cooperating clamping means being of substantially part-cylindrical shape, said clamping means each being rotatable and axially movable relative to said bolt means for clamping cooperation of the clamping surface thereof with a respective washer face, and securing means on said bolt means for urging each of said clamping means towards said washer.

2. A clamp as claimed in claim 1, said bolt means having an enlarged threaded portion and said washer being threaded on said enlarged portion of said bolt means.

3. A clamp as claimed in claim 1, said washer being rigidly secured on said bolt means.

4. A clamp as claimed in claim 1, said securing means comprising nuts screwed onto each end of said bolt means.

5. A clamp as claimed in claim 1, wherein said one washer face has a toroidal shape.

6. A clamp as claimed in claim 1, wherein said opposite faces on said washer each have a toroidal shape.

7. A clamp as claimed in claim 1, wherein one of said washer faces extends in a closed loop about said axis, a portion of said one face having the shape of a concave cylinder segment about an axis spaced from the axis of said bolt means, and the remainder of said one face being of toroidal shape.

8. A clamp as claimed in claim 7, wherein the other one of said washer faces extends in a closed loop about said axis, said loops being axially spaced, a portion of said other face having the shape of a concave cylinder segment about an axis spaced from the axis of said bolt means, and the remainder of said other face being of toroidal shape.

9. A clamp as claimed in claim 8, wherein the axes of said cylinder segments are parallel.

10. A clamp as claimed in claim 8, wherein the axes of said cylinder segments extend in axial planes substantially perpendicular to each other.

References Cited in the file of this patent

UNITED STATES PATENTS

| 1,502,417 | Arnstein | July 22, 1924 |

FOREIGN PATENTS

| 104,090 | Sweden | Mar. 24, 1942 |
| 630,409 | Great Britain | Oct. 12, 1949 |
| 464,787 | Great Britain | Apr. 26, 1937 |
| 1,168,779 | France | Sept. 1, 1958 |